US012748061B2

(12) United States Patent
Horvath

(10) Patent No.: US 12,748,061 B2
(45) Date of Patent: Sep. 29, 2026

(54) SYSTEMS AND METHODS FOR IMPROVED ANALYSIS OF ELECTROMAGNETIC SPECTRA

(71) Applicant: Serva Energy, Inc., Tempe, AZ (US)

(72) Inventor: Ian Shawn Horvath, Phoenix, AZ (US)

(73) Assignee: Serva Energy, Inc., Tempe, AZ (US)

( * ) Notice: Subject to any disclaimer, the term of this patent is extended or adjusted under 35 U.S.C. 154(b) by 155 days.

(21) Appl. No.: 18/781,674

(22) Filed: Jul. 23, 2024

(65) Prior Publication Data

US 2025/0027892 A1 Jan. 23, 2025

Related U.S. Application Data

(60) Provisional application No. 63/515,128, filed on Jul. 23, 2023.

(51) Int. Cl.
*G01N 23/22* (2018.01)

(52) U.S. Cl.
CPC ..... *G01N 23/22* (2013.01); *G01N 2223/1013* (2013.01); *G01N 2223/626* (2013.01)

(58) Field of Classification Search
CPC ........... G01N 23/22; G01N 2223/1013; G01N 2223/626
See application file for complete search history.

(56) References Cited

U.S. PATENT DOCUMENTS

2004/0195517 A1 10/2004 Rowland et al.
2005/0029465 A1 * 2/2005 Lemer .................... G01T 1/167 250/374
2009/0265386 A1 10/2009 March et al.
2010/0121811 A1 5/2010 Ramsden et al.

OTHER PUBLICATIONS

International Search Report and Written Opinion for International Application No. PCT/US2024/039171 dated Sep. 27, 2024.

* cited by examiner

*Primary Examiner* — Kiho Kim
(74) *Attorney, Agent, or Firm* — Wolf, Greenfield & Sacks, P.C.

(57) ABSTRACT

Systems and methods for characterizing electromagnetic spectra are described. The techniques include identifying, using radiation spectroscopy information obtained over a measurement time period, one or more energies associated with electromagnetic radiation emitted by a material or region. The identification includes dividing the measurement time period into two or more subperiods, identifying, for each of the two or more subperiods, measured radiation energies in a subset of the radiation spectroscopy information associated with one of the two or more subperiods, and selecting, from the identified radiation energies for each of the two or more subperiods, radiation energies identified in at least two of the two or more subperiods. The techniques further include identifying, using the selected radiation energies, one or more radioisotopes characterized by the identified radiation energies.

21 Claims, 11 Drawing Sheets

SYSTEMS AND METHODS FOR IMPROVED ANALYSIS OF ELECTROMAGNETIC SPECTRA

RELATED APPLICATIONS

This application claims the benefit under 35 USC § 119(e) of U.S. Provisional Patent Application Ser. No. 63/515,128, filed Jul. 23, 2023, and titled "ELECTRONICS PROVISIONALS," which is incorporated herein by reference in its entirety.

BACKGROUND

Spectroscopy is a branch of science concerned with the spectra of electromagnetic radiation as a function of its wavelength, frequency, or energy as measured by spectrographic equipment in order to obtain information concerning the structure and/or other properties of matter. Examples of electromagnetic spectroscopy include gamma-ray spectroscopy, X-ray spectroscopy, and alpha-particle spectroscopy, among others.

SUMMARY

In some embodiments, the techniques described herein relate to a system including: at least one computer hardware processor, and at least one non-transitory computer readable storage medium storing processor-executable instructions that, when executed by the at least one computer hardware processor, cause the at least one computer hardware processor to perform a method including: identifying, using radiation spectroscopy information obtained over a measurement time period, one or more energies associated with electromagnetic radiation emitted by a measured material by: dividing the measurement time period into two or more subperiods; identifying, for each of the two or more subperiods, measured radiation energies in a subset of the radiation spectroscopy information associated with one of the two or more subperiods; and selecting, from the identified radiation energies for each of the two or more subperiods, radiation energies identified in at least two of the two or more subperiods; and identifying, using the selected radiation energies, one or more radioisotopes present in a composition of the material.

In some embodiments, the techniques described herein relate to at least one non-transitory computer readable storage medium storing processor-executable instructions that, when executed by at least one computer hardware processor, cause the at least one computer hardware processor to perform a method including: identifying, using radiation spectroscopy information obtained over a measurement time period, one or more energies associated with electromagnetic radiation emitted by a measured material by: dividing the measurement time period into two or more subperiods; identifying, for each of the two or more subperiods, measured radiation energies in a subset of the radiation spectroscopy information associated with one of the two or more subperiods; and selecting, from the identified radiation energies for each of the two or more subperiods, radiation energies identified in at least two of the two or more subperiods; and identifying, using the selected radiation energies, one or more radioisotopes present in a composition of the material.

In some embodiments, the techniques described herein relate to a method of characterizing a composition of a material including one or more radioisotopes, the method including: identifying, using radiation spectroscopy information obtained over a measurement time period, one or more energies associated with electromagnetic radiation emitted by the material by: dividing the measurement time period into two or more subperiods; identifying, for each of the two or more subperiods, measured radiation energies in a subset of the radiation spectroscopy information associated with one of the two or more subperiods; and selecting, from the identified radiation energies for each of the two or more subperiods, radiation energies identified in at least two of the two or more subperiods; and identifying, using the selected radiation energies, one or more radioisotopes present in the composition of the material.

In some embodiments, the method further includes generating, using the identified one or more radioisotopes, a certificate of analysis associated with the material.

In some embodiments, the method further includes determining, using the selected radiation energies and the radiation spectroscopy information, at least one of: an atom ratio of the identified one or more radioisotopes, an atom percent of the identified one or more radioisotopes, a weight percent of the identified one or more radioisotopes, and/or a relative atomic weight.

In some embodiments, the method further includes determining a half-life of a first radioisotope of the identified one or more radioisotopes by: identifying a first magnitude of a measured radiation energy associated with the first radioisotope in a first subperiod of the two or more subperiods; identifying a second magnitude of a measured radiation energy associated with the first radioisotope in a second subperiod of the two or more subperiods, the second subperiod having been measured at a later time during the measurement time period than the first subperiod; determining the half-life of the first radioisotope using a difference between the first magnitude and the second magnitude and a length of time between the first subperiod and the second subperiod.

In some embodiments, the method further includes obtaining the radiation spectroscopy information by measuring the electromagnetic radiation using a detector. In some embodiments, measuring the electromagnetic radiation using a detector includes using at least one of a high-purity germanium (HPGe) detector, a sodium iodide (NaI) detector, a silicon lithium (SiLi) detector, and/or a passivated implanted planar silicon (PIPS) detector.

In some embodiments, obtaining the radiation spectroscopy information further includes converting an analog signal generated by the detector to a digital signal using at least one analog-to-digital converter (ADC). In some embodiments, converting the analog signal to the digital signal using the at least one ADC includes using two ADCs arranged in a phase-locked loop.

In some embodiments, obtaining the radiation spectroscopy information further includes time stamping peaks in the digital signal, the peaks being associated with detection of electromagnetic radiation by the detector. In some embodiments, time stamping the peaks in the digital signal includes time stamping the peaks in the digital signal based on a clock rate of the at least one ADC. In some embodiments, the subset of the radiation spectroscopy information is determined using the time-stamped peaks in the digital signal.

In some embodiments, the radiation spectroscopy information is further obtained by generating, using a voltage signal obtained using a radiation detector during the measurement time period, a histogram of total counts of detected electromagnetic radiation as a function of associated radiation energies.

In some embodiments, generating the histogram further includes: determining a bin width value associated with a first maximum amplitude of a peak of the histogram and/or a first minimum full width at half maximum (FWHM) value of a peak of the histogram; determining a DC offset value associated with a second maximum amplitude of a peak of the histogram and/or a second minimum FWHM value of a peak of the histogram; and using the determined bin width value and DC offset value to generate the histogram.

In some embodiments, determining the bin width value and/or the DC offset value includes using a genetic algorithm.

In some embodiments, generating the histogram further includes generated a filtered signal by filtering the voltage signal obtained using the radiation detector using a first moving average, wherein a sampling window associated with the first moving average is selected by determining a first sampling window value associated with a third maximum amplitude of a peak of the histogram and/or a third minimum FWHM value of a peak of the histogram.

In some embodiments, the method further includes: generating a reshaped voltage signal by applying a trapezoid or Gaussian filter to the filtered signal; and filtering the reshaped voltage signal using a second moving average, wherein a sampling window associated with the second moving average is selected by determining a second sampling window value associated with a fourth maximum amplitude of a peak of the histogram and/or a fourth minimum FWHM value of a peak of the histogram.

In some embodiments, selecting the radiation energies identified in at least two of the two or more subperiods includes selecting radiation energies not associated with noise.

DETAILED DESCRIPTION

Figure 1A:
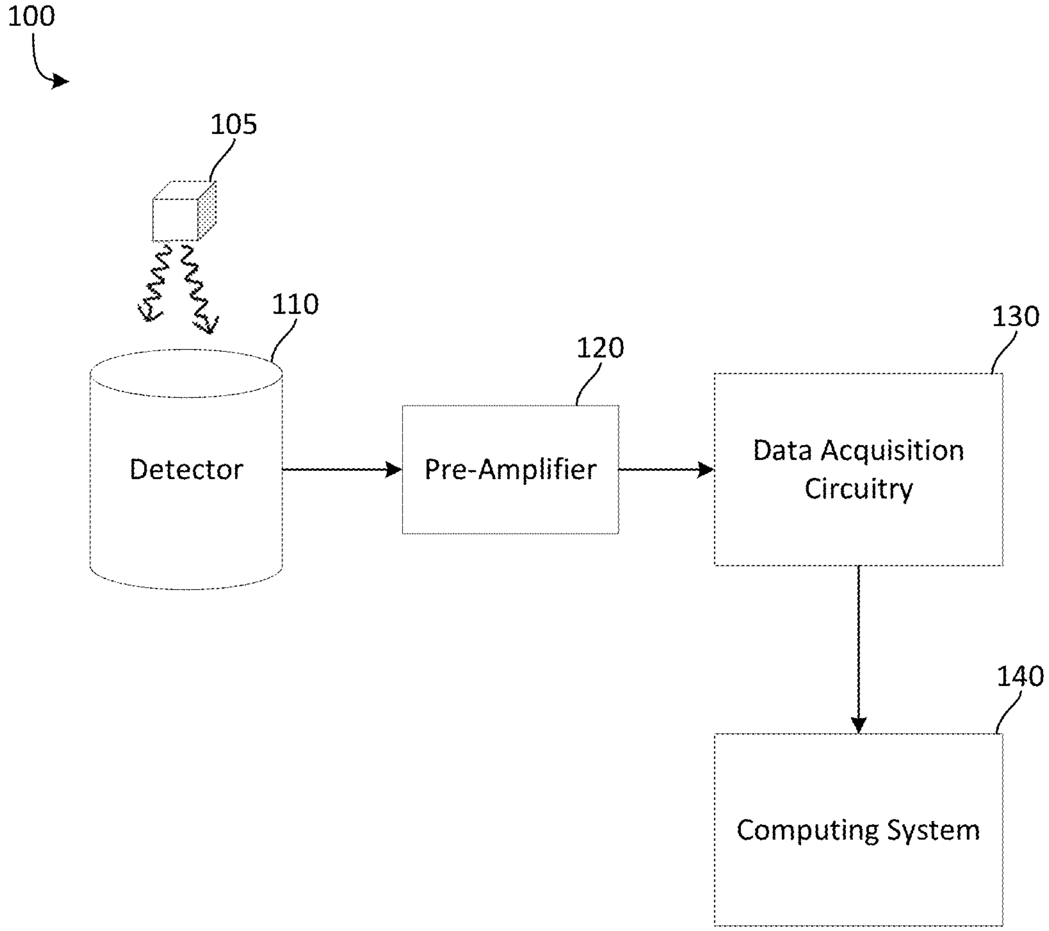
FIG. 1A is a schematic block diagram of an example of a spectroscopy system, in accordance with some embodiments of the technology described herein.

Described herein are improved techniques for the analysis of electromagnetic and/or radioactive emissions from a target material. As one example, the techniques described herein may be used for improved radioisotope identification in the composition of a material by gamma-ray spectroscopy. Electromagnetic spectroscopy and spectrometry techniques have been employed across a wide array of industries and scientific fields of study because of the ubiquity of electromagnetic radiation in our environment, its connection to the fundamental structure of atomic and sub-atomic matter, and the typically non-destructive nature of measuring emitted electromagnetic radiation from a sample. These applications include but are not limited to the nuclear industry, geochemical analysis, forensic science, medical science, industrial process control, and astrophysics, among many others.

Spectroscopy and spectrometry analysis has conventionally focused on improving resolution in the measurement of wavelength, frequency, and/or photon energy to allow for the identification of peaks associated with small volumes of photon emission (e.g., a small volume of or small weight percent of a radioisotope within a sample, a radioisotope with a long half-life, etc.). However, an improved resolution can also result in amplification of spurious noise signals which may falsely be identified as pulses associated with a photon. This effect reduces the overall accuracy of the ultimate identification of material properties and/or composition.

The inventors have recognized that performing time-resolved analysis of radiation spectra may reduce false positives associated with amplified noise, as noise signals are unlikely to be identified as peaks at different time windows within the measurement period. Accordingly, the inventors have developed techniques to attach temporal information to each pulse output by the detector and to perform time-resolved spectroscopic analysis (e.g., to characterize the composition of a material) to yield improved radiation spectra and material analysis.

In some embodiments, the techniques include identifying radioisotopes present in a material and/or region being imaged by generating time-dependent radiation spectroscopy information (e.g., time-dependent pulse height histogram information). The time-dependent radiation spectroscopy information may be generated using measurements (e.g., voltage and/or other electrical signals) of electromagnetic radiation emissions generated by the target material and/or region and measured over a measurement time period. The electrical measurement signal(s) include features (e.g., pulses, peaks, or other distinctive signal features) corresponding to radiation emission events during the measurement time period. These features in the electrical measurement signal(s) are time-stamped. For example, the features may be time-stamped based on one or more clock rates of digital components used to digitize the electrical measurement signal(s). Thereafter, the measurement time period is divided into at least two subperiods (e.g., time windows), with portions of the electrical measurement signal(s) being associated with each of the subperiods based on the time-stamped signal features.

Time-dependent radiation spectroscopy information for each of the subperiods is then generated using the time-stamped features acquired during the respective subperiods. For example, the time-dependent radiation spectroscopy information may comprise a histogram counting the number of radiation emission events as a function or wavelength, frequency, and/or energy of the electromagnetic radiation, and the histogram may be generated by binning the signal features associated with a respective subperiod. Using the time-dependent radiation spectroscopy information, radiation energies are then identified using the location of peaks within respective ones of the time-dependent radiation spectroscopy information. In this manner, a time-dependent series of measured radiation energies is obtained. Thereafter, radiation energies associated with multiple (e.g., at least two, at least three, at least four, at least five, etc. and/or each) of the subperiods are selected as being representative of true radiation emission events (e.g., rather than being representative of spurious noise). Radioisotopes present in the material generating the measured radiation emissions are then identified using the selected radiation energies.

In some embodiments, additional spectrometry analysis may be performed using the radiation spectroscopy information and the selected radiation energies. As non-limiting examples, an atom ratio of the identified one or more radioisotopes, an atom percent of the identified one or more radioisotopes, a weight percent of the identified one or more radioisotopes, and/or a relative atomic weight of the identified one or more radioisotopes may be determined. A certificate of analysis of the material may then be generated.

Additionally, conventional techniques to improve resolution include the use of mixed calibration sources to calibrate the spectrometer over a wide range of incident radiation energies. However, the vast majority of radiation sources emit electromagnetic radiation having energies different than those of the calibration sources. The inventors have additionally recognized and appreciated that this mismatch reduces resolution at the energies of interest and hinders accurate measurements of pulse peak parameters (e.g., height, full width at half maximum (FWHM), etc.). Accordingly, the inventors have developed techniques to optimize pulse resolution regardless of the points of calibration from the calibration source(s).

In some embodiments, prior to performing time-resolved spectral analysis, as described above, various parameters (e.g., of filters or other processing techniques) may be selected in an iterative fashion to optimize a characteristic (e.g., to maximize one or more peak heights, to minimize the FWHM of one or more peak heights) within the pulse height histogram. As one example, moving average filters may be applied to the electrical signals obtained from the radiation detector. In some embodiments, a first moving average filter may be applied to the electrical signals prior to the application of a trapezoid or Gaussian filter, and a second moving average filter may be applied to the reshaped signals after the application of the trapezoid or Gaussian filter. The parameters associated with the first and second moving average filters (e.g., a width) may be selected by determining the parameters that optimize the peak(s) of the pulse height histogram.

In some embodiments, parameters used to generate the pulse height histogram may alternatively or additionally be selected to optimize characteristics of the pulse height histogram. For example, bin width and/or DC offset values may be selected by iteratively determining characteristics (e.g., a maximum amplitude, a minimum FWHM, etc.) of a peak or peaks within the pulse height histogram when generated using different bin width and/or DC offset values.

The techniques described herein represent an improvement over at least some conventional techniques for filtering and/or denoising radiation spectra (e.g., gamma ray spectra) because they may be implemented using algorithms with relatively low computational cost. Additionally, these techniques to optimize spectral resolution can be performed once as a part of initializing a particular detector arrangement rather than being performed for each measurement instance because the detector's calibration parameters remain relatively stable over time. Thus, the computational cost of individual measurement analyses is minimized.

Following below are more detailed descriptions of various concepts related to, and embodiments of, techniques for performing analysis of electromagnetic spectra. It should be appreciated that various aspects described herein may be implemented in any of numerous ways. Examples of specific implementations are provided herein for illustrative purposes only. In addition, the various aspects described in the embodiments below may be used alone or in any combinations and are not limited to the combinations explicitly described herein.

FIG. 1A is a schematic block diagram of an example of a spectroscopy system 100, in accordance with some embodiments of the technology described herein. The spectroscopy system 100 includes a detector 110 configured to measure electromagnetic radiation emissions from a sample 105 of a material to be analyzed. Alternatively or additionally, the detector 110 may be configured to measure electromagnetic radiation emissions from a region or area (e.g., from a region of space, from a region of the earth as measured from a satellite, etc.). The detector 110 may be any suitable type of electromagnetic detector, including but not limited to a semiconductor detector (e.g., a high-purity germanium (HPGe) detector, a silicon lithium (SiLi) detector, a passivated implanted planar silicon (PIPS) detector, a silicon drift detector (SDD), etc.), a scintillation detector (e.g., a sodium iodide (NaI) detector, a cesium iodide (CsI) detector, etc.), and/or a liquid scintillation detector.

Figure 2A:
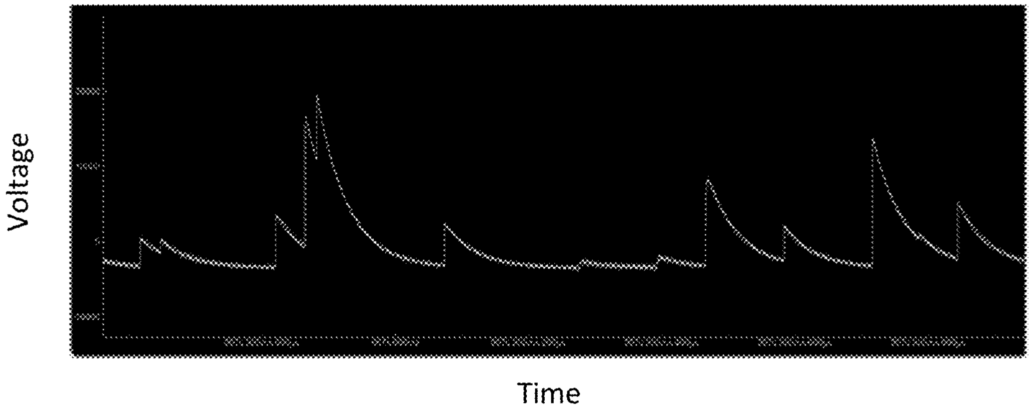
FIG. 2A shows an illustrative voltage signal acquired using a high purity germanium (HPGe) detector, in accordance with some embodiments of the technology described herein.

In some embodiments, the detector 110 may be configured to generate an analog electrical signal (e.g., a voltage signal) including signal features (e.g., peaks, pulses, or other distinctive features) corresponding to the receipt of an emitted photon (e.g., from the sample 105 or from background radiation). FIG. 2A shows an illustrative example of an electrical signal obtained using a gamma ray detector. The signal of FIG. 2A shows a number of voltage pulses obtained as a function of time. The voltage pulses correspond to radiation emission events, with the magnitude of each pulse being correlated to an energy of the detected radiation.

In some embodiments, the analog electrical signal is output from the detector 110 to a pre-amplifier 120 for initial amplification. The amplified signal is then passed from the pre-amplifier 120 to the data acquisition circuitry 130 for digitization. The digitized signal may then be output from the data acquisition circuitry 130 and provided to a computing system 140 for further processing and analysis.

Figure 1B:
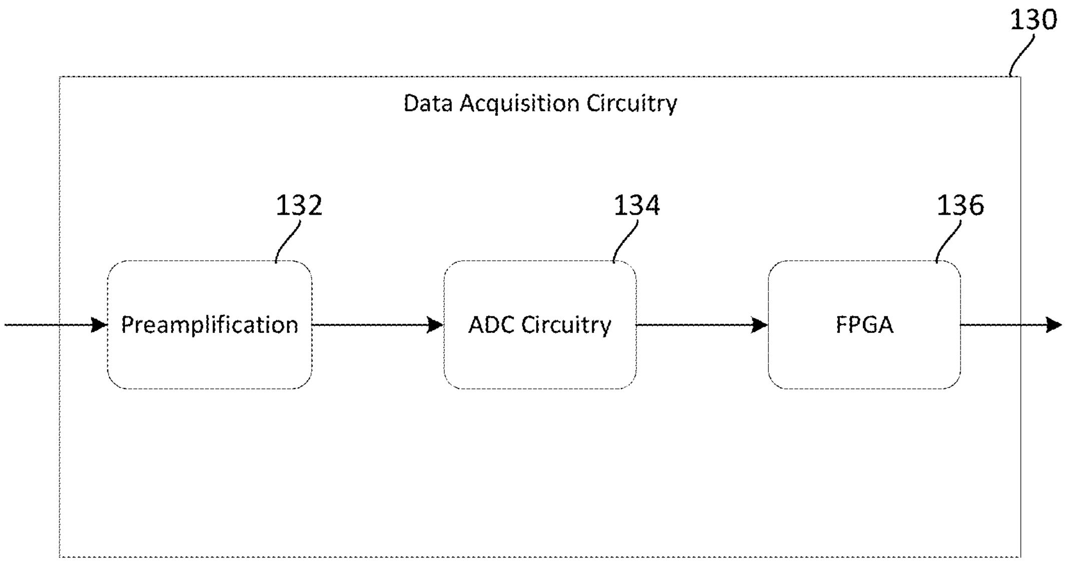
FIG. 1B is a schematic block diagram of an example of data acquisition circuitry, in accordance with some embodiments of the technology described herein.

In some embodiments, and as shown in the example of FIG. 1B, the data acquisition circuitry 130 may include circuitry elements including optional pre-amplification 132, analog-to digital converter (ADC) circuitry 134, and/or field programmable gate array (FPGA) circuitry 136. The optional pre-amplification 132 may be configured to provide additional amplification prior to the conversion of the analog signal to a digital signal by the ADC circuitry 134.

Figure 1C:
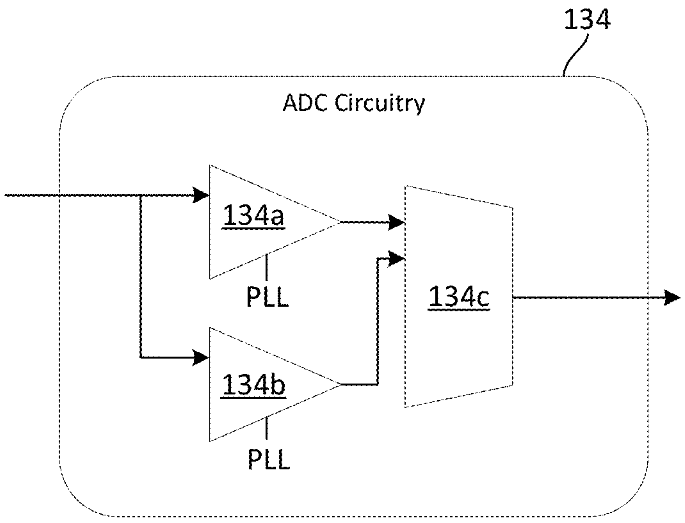
FIG. 1C is a schematic block diagram of an example of analog-to-digital converter (ADC) circuitry, in accordance with some embodiments of the technology described herein.

In some embodiments, and as shown in the example of FIG. 1C, the ADC circuitry 134 may include a first ADC 134*a* and a second ADC 134*b*. In some embodiments, the ADCs 134*a*, 134*b* may be, for example, LTC2165 low power ADCs. The two ADCs 134*a*, 134*b* may be operated in a phase-locked manner (e.g., using a phase-locked loop (PLL)), with their outputs combined by a multiplexer 134*c*. For example, the two ADCs 134*a*, 134*b* may be operated with a 90-degree offset. As another example, the outputs of the two ADCs 134*a*, 134*b* may be interleaved or averaged by the multiplexer 134*c*. In this manner, the digitized signal generated by the ADC circuitry 134 may sample the input analog signal at a rate that is double the clock rate of the individual ADCs 134*a*, 134*b*. For example, the clock rate of the individual ADCs 134*a*, 134*b* may be approximately 125 MHZ, while the sampling rate for the digitized signal may be approximately 250 MHz (e.g., providing sampling approximately every 4 ns).

In some embodiments, the digitized signal may then be output by the ADC circuitry 134 to the FPGA circuitry 136 for initial processing. For example, the FPGA circuitry 136 may be configured to perform initial filtering of the digitized signal and/or other logic operations. Alternatively, the FPGA circuitry 136 may be optional such that the digitized signal may be output from the ADC circuitry 134 directly to the computing system 140.

As illustrated in FIG. 1A, spectroscopy system 100 includes computing system 140. Computing system 140 may be any suitable electronic device configured to receive information from data acquisition circuitry 130 and/or to process obtained measured signals (e.g., obtained from detector 110). In some embodiments, computing system 140 may be a fixed electronic device such as a desktop computer, a rack-mounted computer, or any other suitable fixed electronic device. Alternatively, computing system 140 may be a portable device such as a laptop computer, a smart phone, a tablet computer, or any other portable device.

In some embodiments, the computing system 140 may be configured to store computer-executable instructions (e.g., on tangible computer memory) that, when executed, cause one or more analysis procedures (e.g., as described in connection with FIGS. 3A-3D herein) to be performed on the digitized signal received from the data acquisition circuitry 130. These analysis procedures may include time-stamping the digitized signal (e.g., time-stamping features within the digitized signal or time-stamping the entirety of the digitized signal). For example, the features may be time-stamped based on a clock rate of the ADC circuitry 134. These analysis procedures may also include one or more of filtering and/or optimization procedures to improve the detection of features in the digitized signal received from the data acquisition circuitry 130. Additionally, these analysis procedures may include the generation of one or more pulse height histograms using the digitized signal.

Figure 2B:
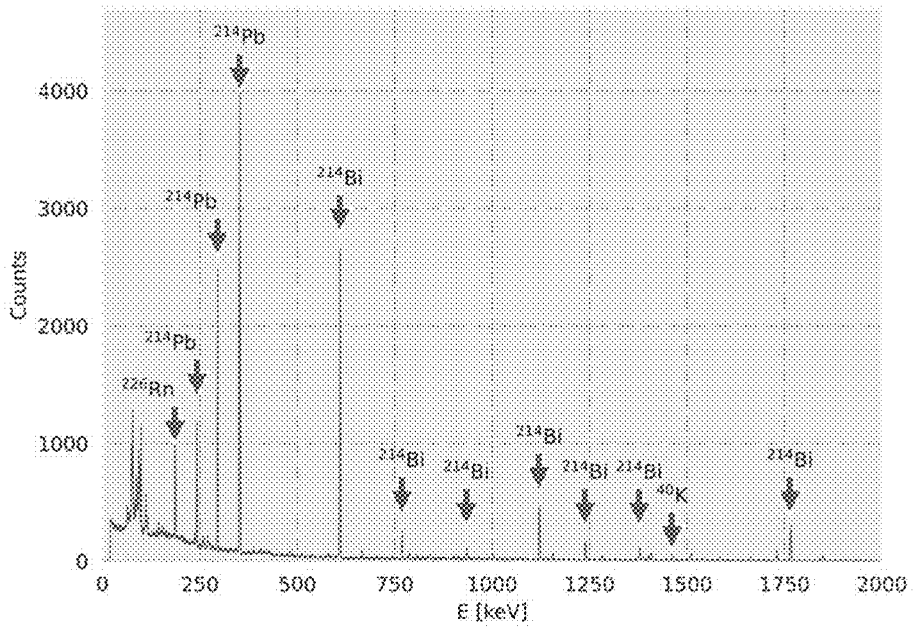
FIG. 2B shows an illustrative gamma ray spectrum, in accordance with some embodiments of the technology described herein.

An example of a pulse height histogram is shown in FIG. 2B. To generate a pulse height histogram, features (e.g., peaks, as shown in FIG. 2A) are identified in the digitized signal obtained from the detector 110. The features are correlated with radiation energies (e.g., based on a magnitude, shape, decay time, or other aspect of the features) and binned based on the determined radiation energies. From the pulse height histogram, radioisotopes within the sample 105 may be identified based on the energies of the peaks in the pulse height histogram.

FIGS. 3A-3D are flowcharts illustrating processes that may be implemented, in part or in whole, to identify one or more radioisotopes in a material, in accordance with some embodiments of the technology described herein. The processing described with reference to FIGS. 3A-3D may be performed using any suitable computing device or devices, as aspects of the technology described herein are not limited in this respect. For example, the processing may be performed by a computing device and/or circuitry that is part of, attached to, or communicatively coupled to an electromagnetic radiation detector. Additionally or alternatively, the processing may be performed by a standalone computing device (e.g., a laptop, desktop, tablet, mobile device, or other suitable computing device). In some embodiments, portions of the processing may be performed by a single computing device or by multiple computing devices (e.g., computing devices that are located remotely from one another and communicatively coupled over a network connection, cloud computing system, or other communication network).

Figure 3A:
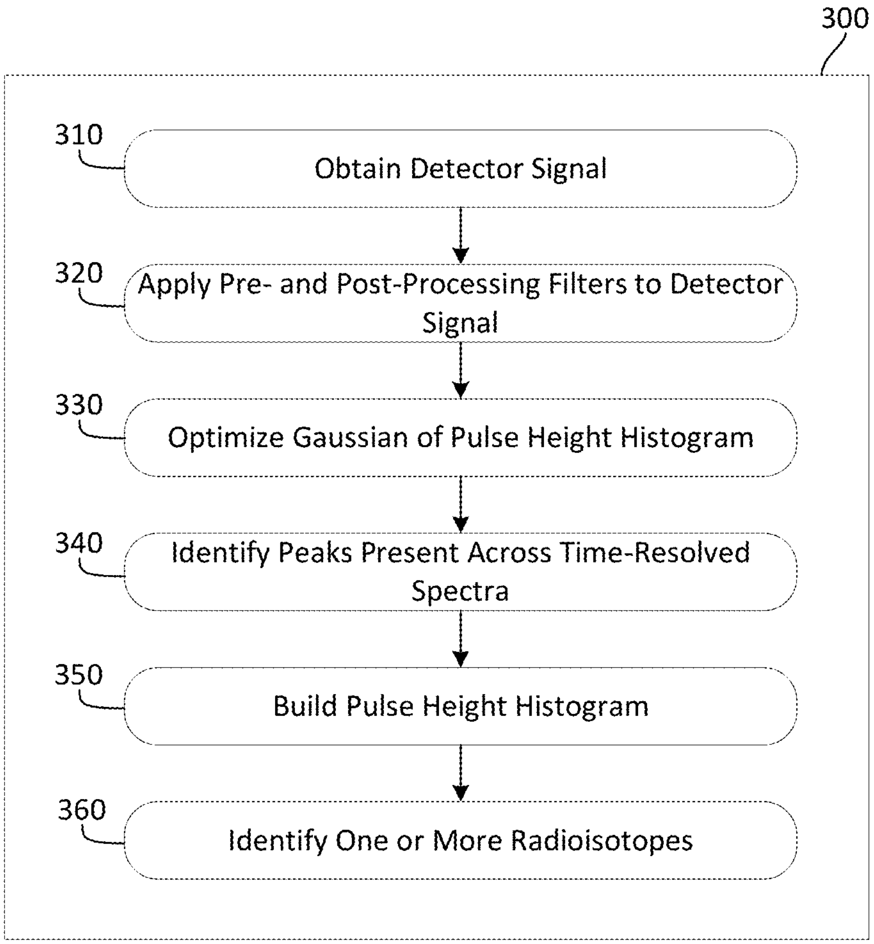
FIG. 3A is a flowchart illustrating a process of identifying one or more radioisotopes in a material, in accordance with some embodiments of the technology described herein.

FIG. 3A is a flowchart illustrating a process 300 of identifying one or more radioisotopes in a material, in accordance with some embodiments of the technology described herein. In some embodiments, the process 300 may begin at act 310, in which a digital signal comprising information indicative of radiation emission events is obtained. In some embodiments, the digital signal may be a measurement of an electrical signal (e.g., a voltage) output by a radiation detector, as described herein. The electrical signal may include one or more features (e.g., peaks, pulses, or other distinctive features) corresponding to the impingement of an instance of electromagnetic radiation onto the detector volume (e.g., as depicted in the example of FIG. 2A herein). In some embodiments, the digital signal may be obtained by accessing the digital signal from at least one computer readable memory (e.g., from computer memory and/or over a communications network). In such embodiments, the digital signal may have been obtained at a prior time and/or remote location.

In some embodiments, obtaining the digital signal may include measuring electromagnetic radiation emitted by a material sample and/or region (e.g., a region of space, a geographical region of Earth) using a radiation detector. The detector may be any suitable type of electromagnetic detector, including but not limited to a semiconductor detector (e.g., a high-purity germanium (HPGc) detector, a silicon lithium (SiLi) detector, a passivated implanted planar silicon (PIPS) detector, a silicon drift detector (SDD), etc.), a scintillation detector (e.g., a sodium iodide (NaI) detector, a cesium iodide (CsI) detector, etc.), and/or a liquid scintillation detector.

In some embodiments, the detector may be configured to generate an analog signal. Obtaining the digital signal may then include converting the analog signal to a digital format using at least one ADC. As described in connection with the example of FIG. 1C herein, converting the analog signal to a digital format may include using two phase-locked ADCs such that the sampling rate is increased (e.g., doubled) over a base clock rate of the ADCs.

In some embodiments, obtaining the digital signal may further include time-stamping the digital signal. For example, discrete data instances within the digital signal may be time-stamped. Alternatively or additionally, features (e.g., peaks, pulses, or other identifiable features) may be time-stamped within the digital signal. In some embodiments, the time stamps may be determined based on the clock rate of the at least one ADC used to digitize the analog signal.

Figure 3B:
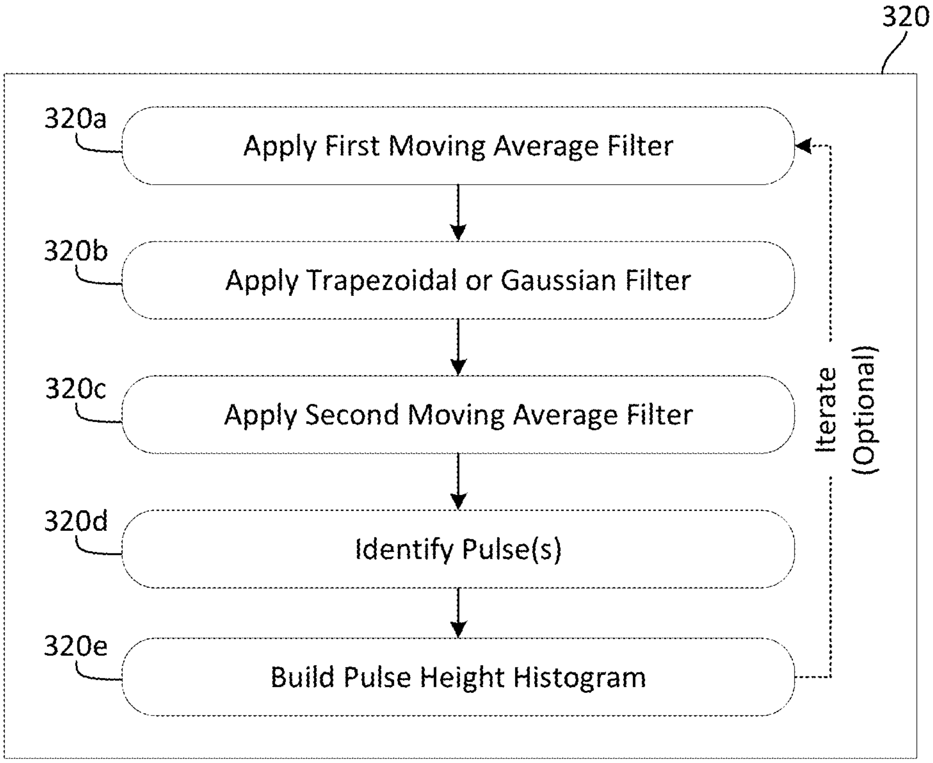
FIG. 3B is a flowchart illustrating a process of optimizing filters to be applied to a voltage signal acquired by a detector, in accordance with some embodiments of the technology described herein.

In some embodiments, after act 310, the process 300 may proceed to act 320, in which pre- and post-processing filters may be applied to the obtained signal. Act 320 may include a number of steps 320*a* through 320*e*, as depicted in the example of FIG. 3B herein. Act 320 may begin at step 320*a*, in which a first moving average filter may be applied to the obtained digital signal. The first moving average filter may be, for example, a simple, continuous, cumulative, exponential, or weighted moving average.

In some embodiments, after step 320*a*, act 320 may proceed to step 320*b*, in which a trapezoid or Gaussian filter may be applied to the filtered digital signal to reshape the peaks within the filtered digital signal. Thereafter, at step 320*c*, a second moving average filter may be applied to the reshaped digital signal to generate a final filtered signal. The second moving average filter may be, for example, a simple, continuous, cumulative, exponential, or weighted moving average.

In some embodiments, after step 320*c*, act 320 may proceed to step 320*d*, in which pulses within the final filtered signal are identified. Using these identified pulses, at step 320*e* a pulse height histogram may be generated by counting identified pulses associated with radiation energy values. For example, a magnitude of each identified pulse may be correlated with a radiation energy to generate the pulse height histogram.

In some embodiments, the parameters of the first and second moving averages may be determined by iterating the steps 320*a* through 320*c*. In particular, the parameters of the first and second moving average filters may be optimized to generate a pulse height histogram with improved peak characteristics (e.g., improved peak height, improved FWHM, or other improved parameters of interest). For example, during calibration and after building the pulse height histogram at step 320*e*, a peak of interest (e.g., a largest peak, a peak corresponding to a radioisotope of interest, etc.) may be selected for optimization. The steps 320*a* through 320*c* may be repeated with different parameters (e.g., different moving average window lengths) used for the first and second moving average filters in steps 320*a* and 320*c*. For the selected peak of interest, after each step 320*e* in the iteration, a characteristic of the peak may be calculated. For example, a peak height or FWHM may be calculated. Parameters of the first and second moving average filters may then be selected to optimize the calculated peak characteristic (e.g., by maximizing a peak height, minimizing a FWHM, optimizing another parameter of the peak of interest, or some combination thereof). It should be appreciated that the parameters of the first and second moving average filters may be optimized separately, in some embodiments, as aspects of the technology described herein are not limited in this respect.

In some embodiments, the parameters of the first and second moving average filters may only need to be determined during a calibration of a detector arrangement and need not be determined each time a material is analyzed using the process 300, as the parameters should remain the same for a particular detector over time. After determining the parameters of the first and second moving average filters for a particular detector arrangement, the steps 320*a* through 320*c* may be applied to the obtained digital signal only once in the process 300.

Figure 3C:
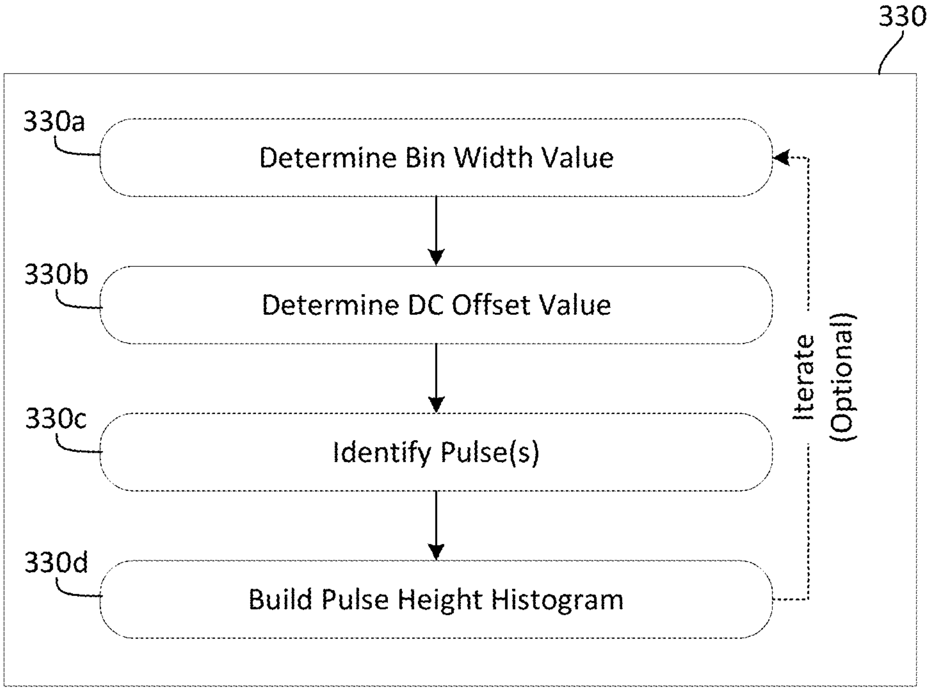
FIG. 3C is a flowchart illustrating a process of optimizing pulse height histogram parameters, in accordance with some embodiments of the technology described herein.

Returning to process 300, after act 320, the process 300 may proceed to act 330, in which the pulse height histogram may further be optimized. Act 330 may include a number of steps 330*a* through 330*d*, as depicted in the example of FIG. 3C herein. Act 330 may begin at step 330*a*, in which a bin width value (e.g., energy/bin) may be selected for later building the pulse height histogram. In some embodiments, after step 330*a*, act 330 may proceed to step 330*b*, in which a DC offset value—a parameter associated with the detector—may be selected for building the pulse height histogram.

In some embodiments, after step 330*b*, act 330 may proceed to step 330*c*, in which pulses are identified within the digital signal using the DC offset value. Pulses may be identified using, for example, any suitable peak finding algorithm. The pulses may be further characterized by correlating the pulse parameters (e.g., height, width, or other pulse parameters) to an energy associated with the detected electromagnetic radiation.

In some embodiments, after step 330*c*, act 330 may proceed to step 330*d*, in which a pulse height histogram may be generated using the bin width value and the identified pulses. The pulse height histogram may be generated by binning the identified pulses according to their correlated radiation energies within appropriate energy bins.

In some embodiments, steps 330*a* through 330*d* may be iterated to select bin width and/or DC offset values to optimize a parameter of a peak of interest within the pulse height histogram. The peak or peaks of interest may be selected based on amplitude (e.g., selecting the largest peak within the histogram) or, alternatively, based on energy (e.g., selecting a peak associated with a radioisotope of interest). Alternatively or additionally, multiple peaks of interest may be selected for optimization, and bin width and/or DC offset values may be selected based on the optimization of two or more peaks within the pulse height histogram. In such embodiments, multiple iterations of steps 330*a* through 330*d* may be performed such that several pairs of bin width values and DC offset values may be selected for specific regions of energies within the pulse height histogram.

Figure 4A:
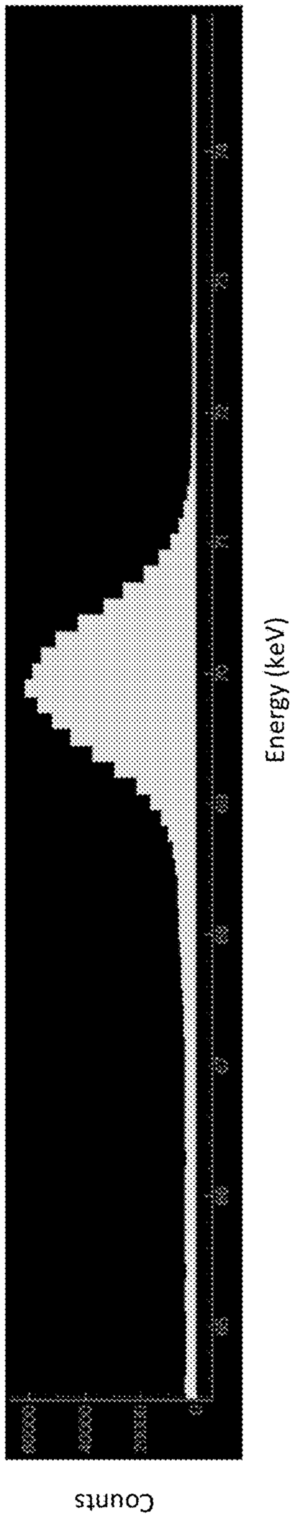
FIG. 4A shows an illustrative peak in a pulse height histogram, in accordance with some embodiments of the technology described herein.
Figure 4B:
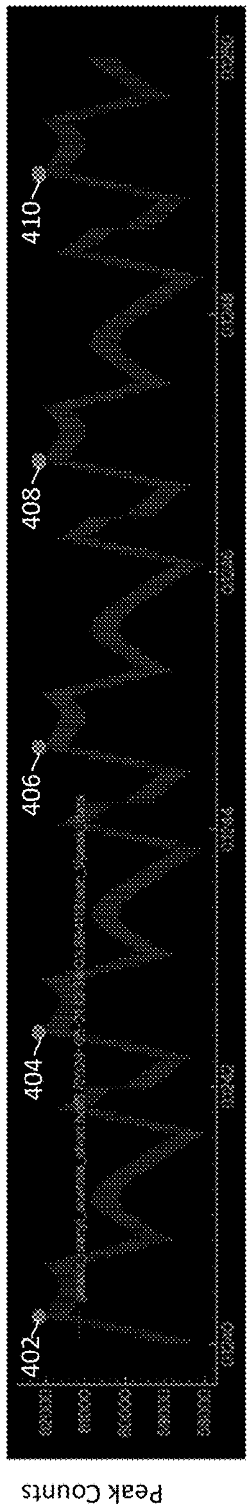
FIG. 4B shows an illustrative technique for selecting a bin width of a pulse height histogram, in accordance with some embodiments of the technology described herein.
Figure 4C:
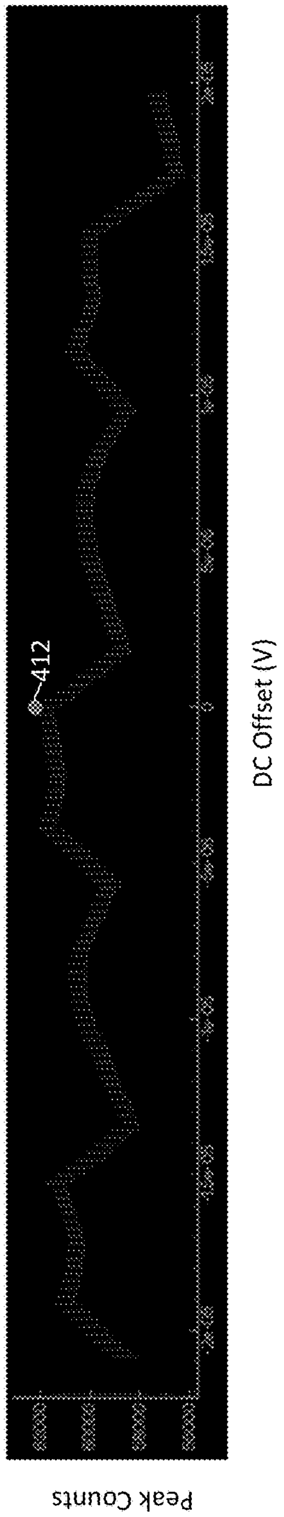
FIG. 4C shows an illustrative technique for optimizing a DC offset associated with the detector, in accordance with some embodiments of the technology described herein.

In some embodiments, the bin width value and/or the DC offset value may be selected to maximize an amplitude of the peak(s) of interest, to minimize a FWHM of the peak(s) of interest, to optimize another characteristic of the peak(s) of interest, and/or to optimize some combination of multiple parameters. An example optimization is shown in FIGS. 4A-4C. FIG. 4A shows an illustrative peak within a pulse height histogram. FIG. 4B illustrates optimization of bin width value for the peak of FIG. 4A by plotting the maximum peak height in counts as a function of bin width values. Bin width values at points 402, 404, 406, 408, and 410 are identified as yielding a same maximum peak height. When multiple bin widths are identified as optimizing the parameter of interest, a single bin width may be selected (e.g., the smallest bin width value, the median bin width value, etc.).

FIG. 4C illustrates optimization of the DC offset value by plotting the maximum peak heights in counts as a function of the DC offset value, in accordance with some embodiments of the technology described herein. In the example of FIG. 4C, a single DC offset value at point 412 is identified as yielding a maximized peak height. However, in the case of multiple DC offset values being identified as yielding a maximized peak height, a single DC offset value may be selected to build the pulse height histogram (e.g., by selecting the smallest DC offset value, a median DC offset value, etc.).

While FIGS. 4B and 4C illustrate optimizing the bin width value and the DC offset value using brute force computational techniques, it should be appreciated that other computational techniques could be used to optimize these parameters. For example, the bin width value and/or the DC offset value may be selected using a genetic algorithm, in some embodiments.

Additionally, in some embodiments, the bin width and/or DC offset values may only need to be determined during a calibration of a detector arrangement and need not be determined each time a material is analyzed using the process 300, as the parameters should remain the same for a particular detector over time. After determining the bin width and/or DC offset values for a particular detector arrangement, act 330 may be omitted from process 300 and the calibrated bin width and/or DC offset values may be used in acts 320, 340, and/or 350. It should further be appreciated that the optimization of acts 320 and 330 may be performed independently of one another (e.g., only act 320 or only act 330 may be implemented in the process 300) or may be omitted from process 300 altogether.

Figure 3D:
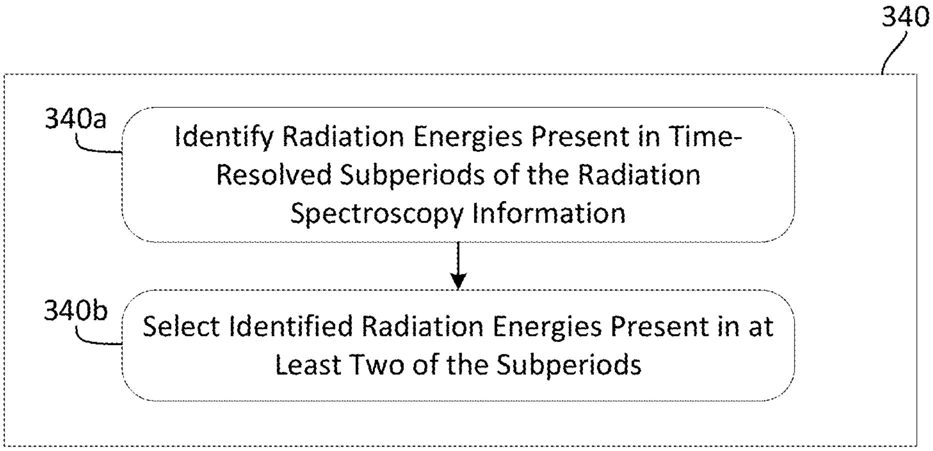
FIG. 3D is a flowchart illustrating a process of identifying radiation energies using time-resolved spectroscopy information, in accordance with some embodiments of the technology described herein.

Returning to process 300, after act 330, or where act 330 is optionally omitted, after act 320, process 300 may proceed to act 340, in which peaks associated with true radiation emission events are identified based on time-resolved spectroscopy. Act 340 may include a number of steps 340*a* and 340*b*, as depicted in the example of FIG. 3D herein. Act 340 may begin at step 340*a*, in which radiation energies are identified within time-resolved subperiods of the acquired radiation spectroscopy information.

In some embodiments, step 340*a* may include associating portions of the filtered digital signal (e.g., from act 320) with time windows within the measurement time period. For example, the filtered digital signal may be associated with respective time windows based on the timestamping applied to the original digitized signal that was obtained. Individual pulse height histograms may then be generated for each time window using the respective portions of the filtered digital signal, and peaks within each of the individual pulse height histogram may be identified (e.g., using any suitable peak finding algorithm). In this manner, series of radiation energies may be identified for each time window within the measurement time period.

After step 340*a*, act 340 may proceed to step 340*b*, in which radiation energies that are present in at least two of the time windows are selected. In some embodiments, radiation energies may be selected if they appear in at least a quarter of the time windows within the measurement time period, at least half of the time windows within the measurement time period, at least three-quarters of the time windows within the measurement time period, or within all of the time windows within the measurement time period. By identifying those radiation energies associated with multiple sets of the time-resolved data, the likelihood of falsely identifying spurious noise signals as being associated with radiation emission events is decreased. In this manner, noise within the radiation spectroscopy data may be decreased without the use of computationally taxing filtering algorithms.

After act 340, process 300 may proceed to act 350, in which a pulse height histogram may be generated using the selected radiation energies from act 340. The pulse height histogram may be generated by binning, as a function of radiation energy, only those peaks appearing in multiple time windows within the measurement time period. Peaks associated with noise (e.g., peaks appearing in only single time windows) are therefore not used to generate the pulse height histogram.

After act 350, process 300 may proceed to act 360, in which one or more radioisotopes are identified as forming the composition of the material measured by the detector. The one or more radioisotopes may be identified based on radiation energies associated with peaks within the pulse height histogram obtained from act 350. For example, the radiation energies identified from the pulse height histogram obtained from act 350 may be correlated with atomic and/or nuclear transitions, atomic decay, and/or other subatomic phenomena that are characteristic of a particular radioisotope.

In some embodiments, after identifying radioisotopes present within the measured material, a certificate of analysis may be generated. For example, the pulse height histogram may be used to generate quantitative information about the material composition. This quantitative information may include one or more of an atom ratio of the identified one or more radioisotopes, an atom percent of the identified one or more radioisotopes, a weight percent of the identified one or more radioisotopes, and/or a relative atomic weight of the identified one or more radioisotopes.

Figure 5:
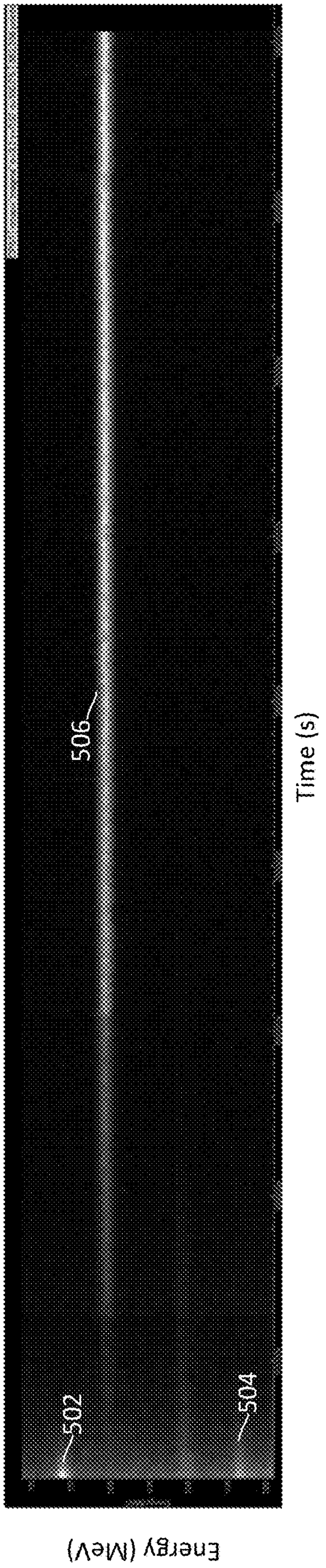
FIG. 5 shows an example of a time-dependent spectrogram, in accordance with some embodiments of the technology described herein.

In some embodiments, the process 300 may further include determining a half-life of at least one of the identified radioisotopes using the time-resolved radiation spectroscopy information obtained in act 340. An example of a time-resolved spectrum is shown in FIG. 5, with energy of measured radiation plotted as a function of time. As seen in FIG. 5, peak 502 at 1103 keV and peak 504 at 1057 keV are relatively short-lived, while peak 506 at 1092 keV increases in intensity over time.

A half-life of an isotope (e.g., for either of peaks 502 or 504) may be determined by identifying a magnitude (e.g., a number of counts) of a measured peak for at least two time windows within the measurement time period. The magnitude may be determined based on a maximum amplitude of a peak associated with the radiation energy and/or by integrating under the peak associated with the radiation energy. The half-life may then be determined using the length of time between the selected time windows and the determined magnitude values. As one example, the half-life may be determined by fitting the magnitude values according to the exponential decay of a radioisotope:

$$N(t) = N_0 e^{-\lambda t}$$

where N(t) is the number of un-decayed nuclei at time t, $N_0$ is the number of un-decayed nuclei at time t=0, and $\lambda$ is the nuclear decay constant. This exponential decay fitting provides the nuclear decay constant, $\lambda$. The half-life, $\tau$, may then be determined using the relation:

$$\tau = \frac{\ln(2)}{\lambda}.$$

Figure 6A:
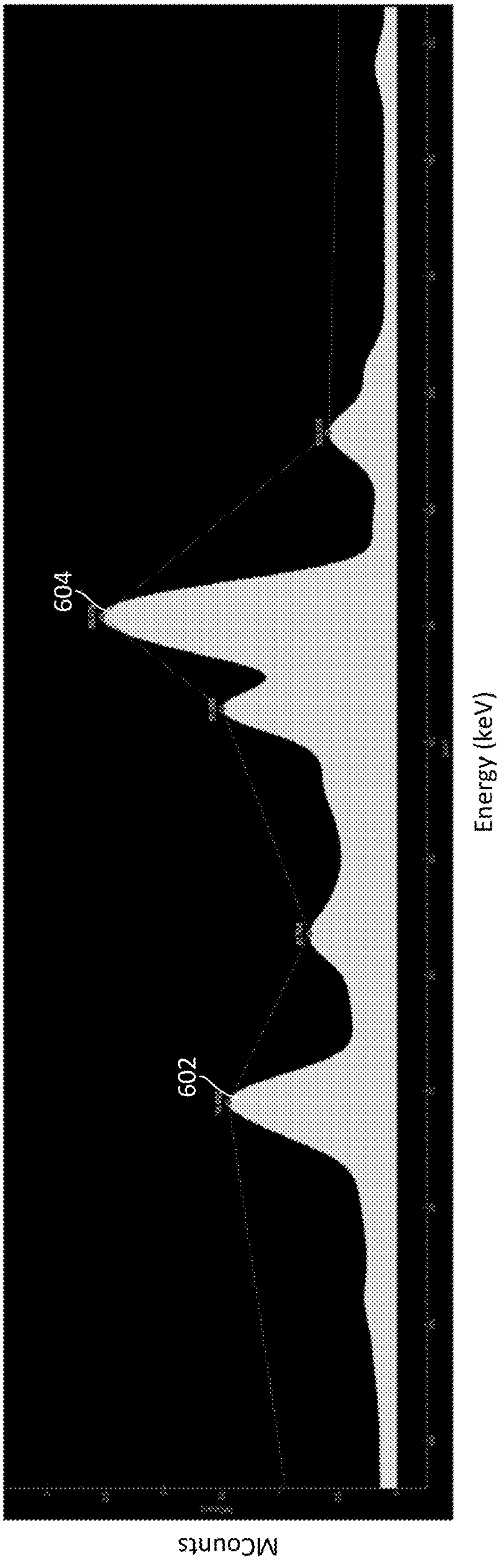
FIGS. 6A and 6B show examples of a pulse height histogram and a time-resolved spectrogram generated based on the same spectroscopy data, in accordance with some embodiments of the technology described herein.
Figure 6B:
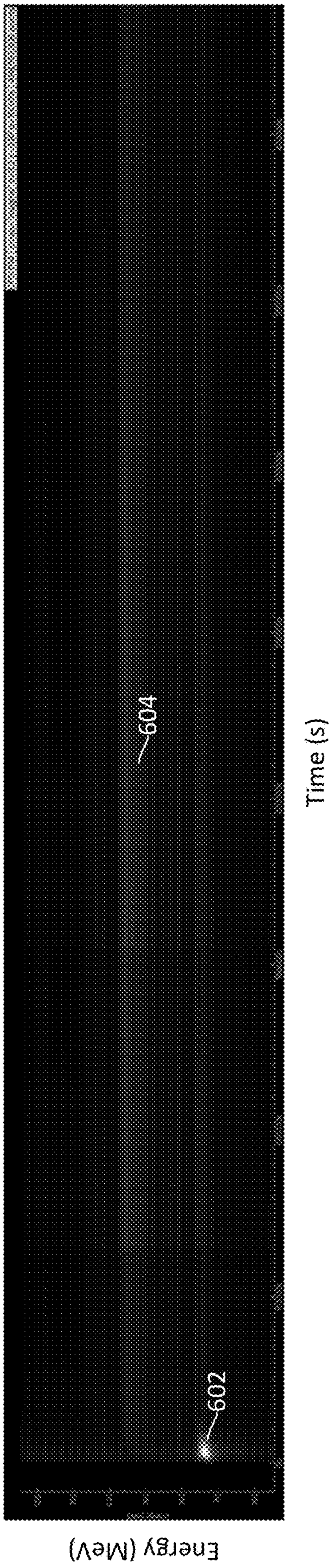

FIGS. 6A and 6B show examples of a pulse height histogram and a time-resolved spectrogram generated using the same spectroscopy data, in accordance with some embodiments of the technology described herein. FIG. 6A shows a pulse height histogram generated using spectroscopy data acquired over the entirety of the measurement time period. Peaks 602 and 604 are both prominent in FIG. 6A. In contrast, FIG. 6B shows a time-resolved spectrogram that makes clear that peak 602 was generated by a radioisotope with a short half-life, as the counts received decrease quickly over time, while peak 604 is relatively stable over the measurement time period.

Figure 7:
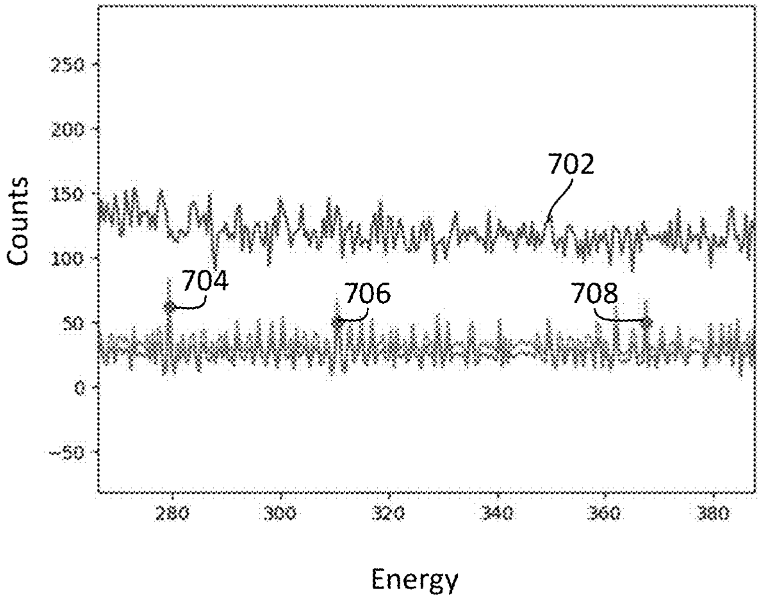
FIG. 7 shows pulse height histograms generated using conventional spectroscopy techniques and time-ensembled spectroscopy techniques, in accordance with some embodiments of the technology described herein.

As another example, FIG. 7 shows pulse height histograms generated using conventional spectroscopy techniques and time-ensembled spectroscopy techniques, in accordance with some embodiments of the technology described herein. Curve 702 is a pulse height histogram generated from measurements of an aged isotope source without using any time-resolved techniques. In contrast, the lower curve was generated using time-resolved spectroscopy as described herein, enabling the detection of hidden peaks 704, 706, and 708.

Figure 8:
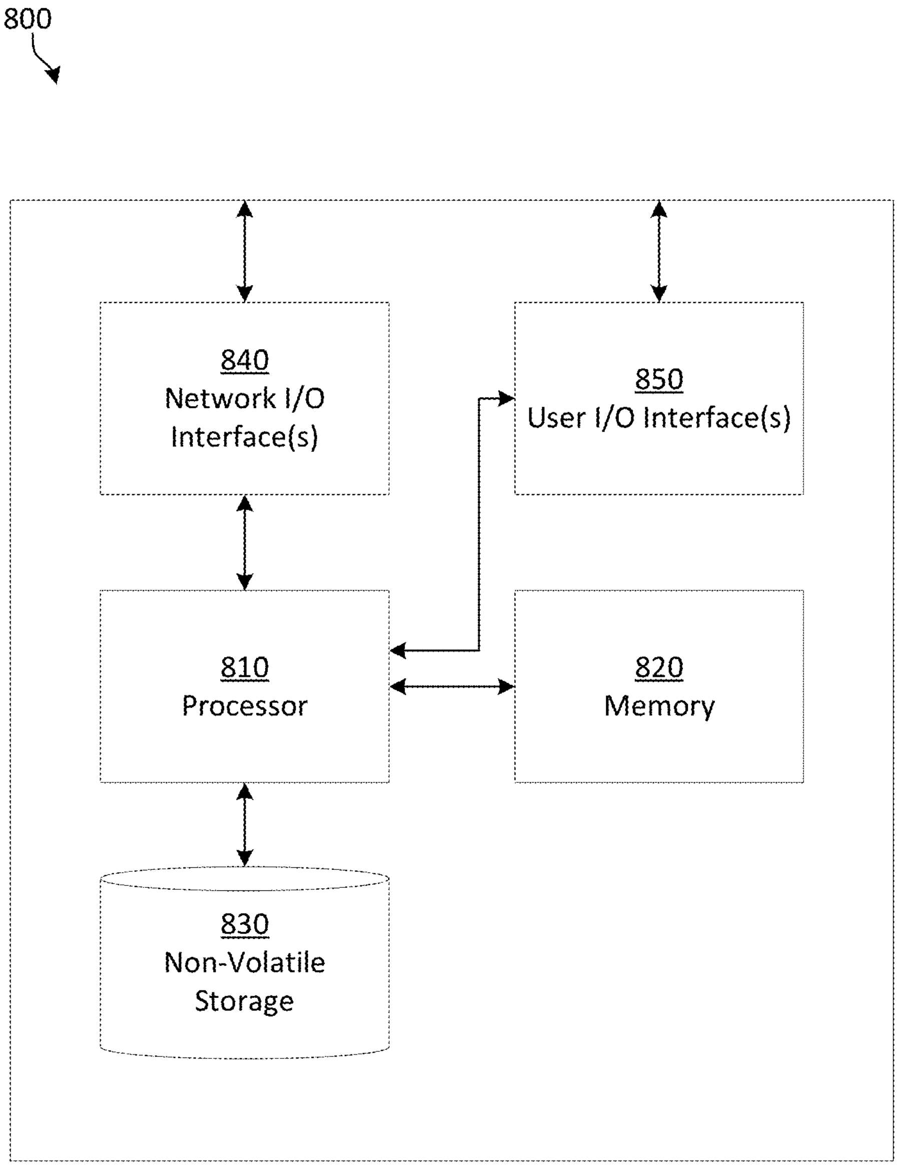
FIG. 8 is a schematic block diagram of an illustrative implementation of an improved computer system that may be used in connection with some embodiments of the technology described herein.

An illustrative implementation of an improved computer system 800 that may be used in connection with any of the embodiments of the technology described herein (e.g., such as the method of FIGS. 3A-3D) is shown in FIG. 8. The computer system 800 includes one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner, as the aspects of the technology described herein are not limited to any particular techniques for writing or reading data. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

Computer system 800 may also include a network input/output (I/O) interface 840 via which the computing device may communicate with other computing devices (e.g., over a network), and may also include one or more user I/O interfaces 850, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone, a tablet, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within ±20% of a target value in some embodiments, within ±10% of a target value in some embodiments, within ±5% of a target value in some embodiments, within ±2% of a target value in some embodiments. The terms "approximately," "substantially," and "about" may include the target value.

What is claimed is:

1. A method of characterizing a composition of a material comprising one or more radioisotopes, the method comprising:

identifying, using radiation spectroscopy information obtained over a measurement time period, one or more energies associated with electromagnetic radiation emitted by the material by:

dividing the measurement time period into two or more subperiods;

identifying, for each of the two or more subperiods, measured radiation energies in a subset of the radiation spectroscopy information associated with one of the two or more subperiods; and selecting, from the identified radiation energies for each of the two or more subperiods, radiation energies identified in at least two of the two or more subperiods; and identifying, using the selected radiation energies, one or more radioisotopes present in the composition of the material.

2. The method of claim 1, further comprising generating, using the identified one or more radioisotopes, a certificate of analysis associated with the material, wherein generating the certificate of analysis comprises determining, using the selected radiation energies and the radiation spectroscopy information, at least one of: an atom ratio of the identified one or more radioisotopes, an atom percent of the identified one or more radioisotopes, a weight percent of the identified one or more radioisotopes, and/or a relative atomic weight.

3. The method of claim 1, further comprising determining a half-life of a first radioisotope of the identified one or more radioisotopes by:

identifying a first magnitude of a measured radiation energy associated with the first radioisotope in a first subperiod of the two or more subperiods;

identifying a second magnitude of a measured radiation energy associated with the first radioisotope in a second subperiod of the two or more subperiods, the second subperiod having been measured at a later time during the measurement time period than the first subperiod;

determining the half-life of the first radioisotope using a difference between the first magnitude and the second magnitude and a length of time between the first subperiod and the second subperiod.

4. The method of claim 1, further comprising obtaining the radiation spectroscopy information by measuring the electromagnetic radiation using a detector.

5. The method of claim 4, wherein measuring the electromagnetic radiation using a detector comprises using at least one of a high-purity germanium (HPGe) detector, a sodium iodide (NaI) detector, a silicon lithium (SiLi) detector, and/or a passivated implanted planar silicon (PIPS) detector.

6. The method of claim 5, wherein obtaining the radiation spectroscopy information further comprises converting an analog signal generated by the detector to a digital signal using two ADCs arranged in a phase-locked loop.

7. The method of claim 6, wherein obtaining the radiation spectroscopy information further comprises time stamping peaks in the digital signal based on a clock rate of one of the two ADCs, the peaks being associated with detection of electromagnetic radiation by the detector.

8. The method of claim 7, wherein the subset of the radiation spectroscopy information is determined using the time-stamped peaks in the digital signal.

9. The method of claim 1, wherein the radiation spectroscopy information is further obtained by generating, using a voltage signal obtained using a radiation detector during the measurement time period, a histogram of total counts of detected electromagnetic radiation as a function of associated radiation energies, and wherein generating the histogram further comprises:

determining a bin width value associated with a first maximum amplitude of a peak of the histogram and/or a first minimum full width at half maximum (FWHM) value of a peak of the histogram;

determining a DC offset value associated with a second maximum amplitude of a peak of the histogram and/or a second minimum FWHM value of a peak of the histogram; and using the determined bin width value and DC offset value to generate the histogram.

10. The method of claim 9, wherein generating the histogram further comprises generated a filtered signal by filtering the voltage signal obtained using the radiation detector using a first moving average, wherein a sampling window associated with the first moving average is selected by determining a first sampling window value associated with a third maximum amplitude of a peak of the histogram and/or a third minimum FWHM value of a peak of the histogram.

11. The method of claim 10, further comprising:

generating a reshaped voltage signal by applying a trapezoid or Gaussian filter to the filtered signal; and filtering the reshaped voltage signal using a second moving average, wherein a sampling window associated with the second moving average is selected by determining a second sampling window value associated with a fourth maximum amplitude of a peak of the histogram and/or a fourth minimum FWHM value of a peak of the histogram.

12. The method of claim 1, wherein selecting the radiation energies identified in at least two of the two or more subperiods comprises selecting radiation energies not associated with noise.

13. A system comprising:

at least one computer hardware processor, and at least one non-transitory computer readable storage medium storing processor-executable instructions that, when executed by the at least one computer hardware processor, cause the at least one computer hardware processor to perform a method comprising:

identifying, using radiation spectroscopy information obtained over a measurement time period, one or more energies associated with electromagnetic radiation emitted by a measured material by:

dividing the measurement time period into two or more subperiods;

identifying, for each of the two or more subperiods, measured radiation energies in a subset of the radiation spectroscopy information associated with one of the two or more subperiods; and selecting, from the identified radiation energies for each of the two or more subperiods, radiation energies identified in at least two of the two or more subperiods; and identifying, using the selected radiation energies, one or more radioisotopes present in a composition of the material.

14. The system of claim 13, further comprising generating, using the identified one or more radioisotopes, a certificate of analysis associated with the material, wherein generating the certificate of analysis comprises determining, using the selected radiation energies and the radiation spectroscopy information, at least one of: an atom ratio of the identified one or more radioisotopes, an atom percent of the identified one or more radioisotopes, a weight percent of the identified one or more radioisotopes, and/or a relative atomic weight.

15. The system of any claim 13, further comprising a detector, wherein obtaining the radiation spectroscopy information comprises measuring the electromagnetic radiation using the detector.

16. The system of claim 15, further comprising two analog-to-digital converters (ADCs) arranged in a phase-locked loop, wherein obtaining the radiation spectroscopy information comprises converting an analog signal generated by the detector to a digital signal using the two ADCs.

17. The system of claim 16, wherein obtaining the radiation spectroscopy information further comprises time stamping peaks in the digital signal based on a clock rate of one of the two ADCs, the peaks being associated with detection of electromagnetic radiation by the detector.

18. The system of any one of claim 17, wherein the radiation spectroscopy information is further obtained by generating, using a voltage signal obtained using the detector during the measurement time period, a histogram of total counts of detected electromagnetic radiation as a function of associated radiation energies, and wherein generating the histogram further comprises:

determining a bin width value associated with a first maximum amplitude of a peak of the histogram and/or a first minimum full width at half maximum (FWHM) value of a peak of the histogram;

determining a DC offset value associated with a second maximum amplitude of a peak of the histogram and/or a second minimum FWHM value of a peak of the histogram; and using the determined bin width value and DC offset value to generate the histogram.

19. The system of claim 18, wherein generating the histogram further comprises generated a filtered signal by filtering the voltage signal obtained using the detector using a first moving average, wherein a sampling window associated with the first moving average is selected by determining a first sampling window value associated with a third maximum amplitude of a peak of the histogram and/or a third minimum FWHM value of a peak of the histogram.

20. The system of claim 19, further comprising:

generating a reshaped voltage signal by applying a trapezoid or Gaussian filter to the filtered signal; and filtering the reshaped voltage signal using a second moving average, wherein a sampling window associated with the second moving average is selected by determining a second sampling window value associated with a fourth maximum amplitude of a peak of the histogram and/or a fourth minimum FWHM value of a peak of the histogram.

21. At least one non-transitory computer readable storage medium storing processor-executable instructions that, when executed by at least one computer hardware processor, cause the at least one computer hardware processor to perform a method comprising:

identifying, using radiation spectroscopy information obtained over a measurement time period, one or more energies associated with electromagnetic radiation emitted by a measured material by:

dividing the measurement time period into two or more subperiods;

identifying, for each of the two or more subperiods, measured radiation energies in a subset of the radiation spectroscopy information associated with one of the two or more subperiods; and selecting, from the identified radiation energies for each of the two or more subperiods, radiation energies identified in at least two of the two or more subperiods; and identifying, using the selected radiation energies, one or more radioisotopes present in a composition of the material.

* * * * *